(12) United States Patent
Narendra et al.

(10) Patent No.: US 8,477,940 B2
(45) Date of Patent: *Jul. 2, 2013

(54) SYMMETRIC CRYPTOGRAPHY WITH USER AUTHENTICATION

(75) Inventors: Siva G. Narendra, Portland, OR (US); Prabhakar Tadepalli, Bangalore (IN); Thomas N. Spitzer, Portland, OR (US)

(73) Assignee: Tyfone, Inc., Portland, OR (US)

( * ) Notice: Subject to any disclaimer, the term of this patent is extended or adjusted under 35 U.S.C. 154(b) by 1931 days.

This patent is subject to a terminal disclaimer.

(21) Appl. No.: 11/182,099

(22) Filed: Jul. 15, 2005

(65) Prior Publication Data

US 2007/0014407 A1    Jan. 18, 2007

(51) Int. Cl.
*H04K 1/00* (2006.01)

(52) U.S. Cl.
USPC .......................................................... 380/270

(58) Field of Classification Search
USPC .......................................................... 380/277
See application file for complete search history.

(56) References Cited

U.S. PATENT DOCUMENTS

| | | |
|---|---|---|
| 5,585,787 A | 12/1996 | Wallerstein |
| 5,952,641 A | 9/1999 | Korshun |
| 5,995,630 A | 11/1999 | Borza |
| 6,035,398 A | 3/2000 | Bjorn |
| 6,219,439 B1 | 4/2001 | Burger |
| 6,315,195 B1 | 11/2001 | Ramachandran |
| 6,330,674 B1 | 12/2001 | Angelo et al. |
| 6,594,759 B1 | 7/2003 | Wang |
| 6,598,031 B1 | 7/2003 | Ice |
| 6,609,654 B1 | 8/2003 | Anderson et al. |
| 6,636,833 B1 | 10/2003 | Flitcroft et al. |
| 6,687,375 B1 | 2/2004 | Matyas et al. |
| 6,705,520 B1 | 3/2004 | Pitroda et al. |
| 6,769,607 B1 | 8/2004 | Pitroda et al. |
| 6,805,288 B2 | 10/2004 | Routhenstein et al. |
| 6,836,843 B2 | 12/2004 | Seroussi et al. |
| 6,845,453 B2 | 1/2005 | Scheidt et al. |
| 6,845,908 B2 | 1/2005 | Morita et al. |
| 6,848,050 B1 | 1/2005 | Merman et al. |
| 6,857,566 B2 | 2/2005 | Wankmueller |
| 6,871,278 B1 | 3/2005 | Sciupac |
| 6,886,096 B2 | 4/2005 | Appenzeller et al. |
| 6,901,145 B1 | 5/2005 | Bohannon et al. |
| 6,908,030 B2 | 6/2005 | Rajasekaran et al. |
| 7,502,928 B2 * | 3/2009 | Suzuoki et al. ............... 713/166 |
| 7,805,615 B2 | 9/2010 | Narendra et al. |

(Continued)

FOREIGN PATENT DOCUMENTS

| | | |
|---|---|---|
| GB | 2390705 | 1/2004 |
| WO | 0036566 A1 | 6/2000 |

(Continued)

OTHER PUBLICATIONS

PCT/US2006/027980, Written Opinion, Mailed Dec. 27, 2006, 13.

(Continued)

*Primary Examiner* — Michael S McNally
*Assistant Examiner* — Daniel Hoang
(74) *Attorney, Agent, or Firm* — Dana LeMoine; LeMoine Patent Services, PLLC

(57) ABSTRACT

A device uses a user authentication factor to generate a symmetric key for use in symmetric cryptography. The user authentication factor is encrypted and stored for authentication during decryption.

37 Claims, 4 Drawing Sheets

U.S. PATENT DOCUMENTS

| | | |
|---|---|---|
| 2001/0001876 A1 | 5/2001 | Morgan et al. |
| 2001/0007132 A1 | 7/2001 | Regev |
| 2001/0034718 A1 | 10/2001 | Shaked et al. |
| 2002/0039063 A1 | 4/2002 | Ritter |
| 2002/0096570 A1 | 7/2002 | Wong et al. |
| 2002/0099665 A1 | 7/2002 | Burger et al. |
| 2002/0152391 A1* | 10/2002 | Willins et al. ............... 713/186 |
| 2002/0180584 A1 | 12/2002 | McGregor et al. |
| 2002/0184509 A1 | 12/2002 | Scheidt et al. |
| 2002/0186845 A1 | 12/2002 | Dutta et al. |
| 2003/0028481 A1 | 2/2003 | Flitcroft et al. |
| 2003/0061168 A1 | 3/2003 | Routhenstein |
| 2003/0081785 A1* | 5/2003 | Boneh et al. ............... 380/277 |
| 2003/0220876 A1 | 11/2003 | Burger et al. |
| 2004/0044896 A1 | 3/2004 | Kelley et al. |
| 2004/0050930 A1 | 3/2004 | Rowe |
| 2004/0133787 A1 | 7/2004 | Doughty et al. |
| 2004/0139329 A1* | 7/2004 | Abdallah et al. ............. 713/182 |
| 2005/0005135 A1 | 1/2005 | Chen et al. |
| 2005/0006462 A1 | 1/2005 | Rouille et al. |
| 2005/0015596 A1 | 1/2005 | Bowers |
| 2005/0029349 A1 | 2/2005 | McGregor et al. |
| 2005/0038736 A1 | 2/2005 | Saunders |
| 2005/0044044 A1 | 2/2005 | Burger |
| 2005/0050367 A1 | 3/2005 | Burger et al. |
| 2005/0060586 A1 | 3/2005 | Burger et al. |
| 2005/0077349 A1 | 4/2005 | Bonalle |
| 2005/0108096 A1 | 5/2005 | Burger et al. |
| 2005/0109838 A1 | 5/2005 | Linlor |
| 2005/0116026 A1 | 6/2005 | Burger et al. |
| 2005/0121512 A1 | 6/2005 | Wankmueller |
| 2005/0127164 A1 | 6/2005 | Wankmueller |

FOREIGN PATENT DOCUMENTS

| | | |
|---|---|---|
| WO | WO-03029942 A2 | 4/2003 |
| WO | WO-03081519 A2 | 10/2003 |
| WO | 2007011991 A2 | 1/2007 |
| WO | WO-2007011992 A1 | 1/2007 |

OTHER PUBLICATIONS

Menezes, et al., "Handbook of Applied Cryptography," 1997, CC Press LLC, 330-331, 386-389, 394-395, 551-553.

Uludag, U. "Multimedia Content Protection via Biometrics-based Encryption", Multimedia and Expo, 2003, Proceedings 2003 International Conference, vol. 3, (Jul. 2003), 237-240.

"PCT Search Report", PCT/US2006/027979, (Jul. 17, 2006), 1-13.

U.S. Appl. No. 11/182,920 Office Action Mailed Feb. 3, 2009, 12 pages.

U.S. Appl. No. 11/182,920 Office Action Mailed Nov. 9, 2009, 14 pages.

U.S. Appl. No. 11/182,920 Office Action Mailed Aug. 25, 2010, 14 pages.

U.S. Appl. No. 11/182,920 Office Action Mailed Apr. 8, 2011, 14 pages.

U.S. Appl. No. 11/182,920 Office Action Mailed Feb. 14, 2012, 5 pages.

* cited by examiner

SYMMETRIC CRYPTOGRAPHY WITH USER AUTHENTICATION

FIELD

The present invention relates generally to secure data storage, and more specifically to the use of symmetric cryptography for secure data storage.

BACKGROUND

Cryptography may be used to limit access to data. For example, sensitive data in computers or networks may be encrypted to block access by unauthorized users. Cryptography may be utilized to securely store information or to securely share information.

Different types of cryptography are in use today. Examples include symmetric cryptography and asymmetric cryptography. In symmetric cryptography, encryption and decryption are performed with the same "key." Symmetric cryptography is sometimes also referred to as secret key cryptography, because the key cannot be disclosed for the data to remain secure. Triple-DES cryptography is an example of symmetric cryptography.

Asymmetric cryptography uses two keys: an encryption key, and a decryption key, where the encryption key is derived from the decryption key using a one-way function. In asymmetric cryptography, the encryption key (also referred to as the public key) can be disclosed since it can only encrypt and not decrypt data. The decryption key (also referred to as the private key) cannot be disclosed for the data to remain secure. Examples of asymmetric cryptography include Rivest-Shamir-Adleman (RSA) and elliptic curve cryptography.

DESCRIPTION OF EMBODIMENTS

Figure 1:
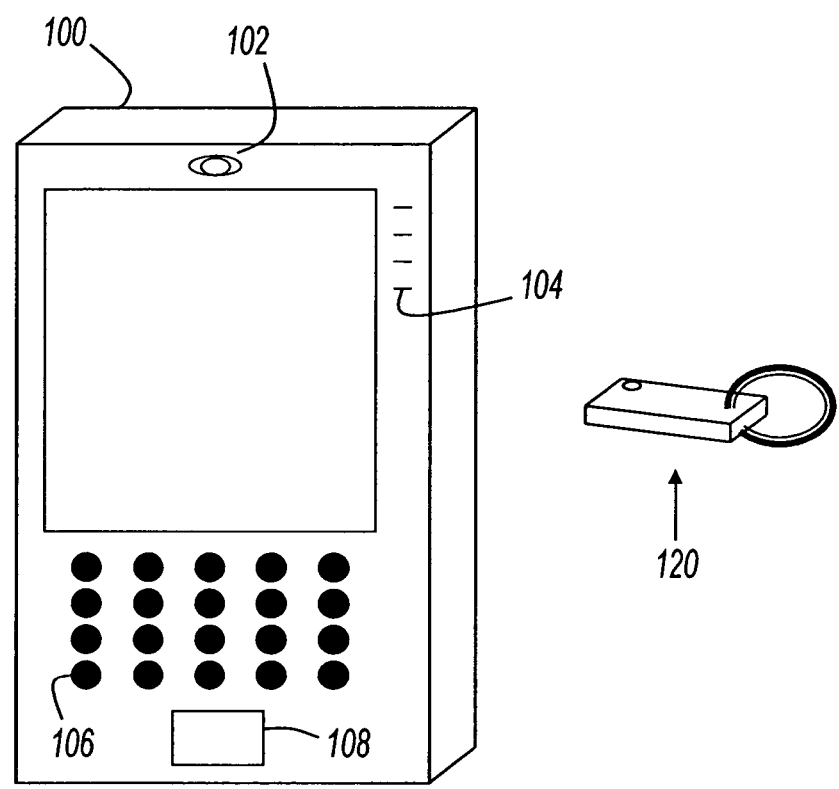
FIG. 1 shows a mobile electronic device in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile electronic device. Mobile electronic device 100 may be any type of electronic device considered to be mobile. For example, mobile electronic device 100 may be a personal digital assistant (PDA), a smartphone, a mobile phone, a handheld computer, or any other device capable of operating as described herein. FIG. 1 also shows secondary electronic device 120. Secondary electronic device 120 is shown as a key fob separate from mobile electronic device 100 in FIG. 1, but this is not a limitation of the present invention. For example, secondary electronic device 120 may be a card that attaches to, and detaches from, mobile electronic device 100. Accordingly, secondary electronic device 120 may be separate from, or separable from, mobile electronic device 100.

Mobile electronic device 100 is shown including controls 106, fingerprint scanner 108, voice input 104, and retinal scanner 102. Fingerprint scanner 108, voice input 104, and retinal scanner 102 are examples of biometric information collection devices capable of collecting biometric information to authenticate a user of mobile device 100. Controls 106 represent an input device capable of accepting other types of user authentication information, such as a password or personal identification number (PIN).

Biometric information, passwords, and PINs are examples of user authentication factors (UAF) useful to authenticate a user to mobile electronic device 100. For example, access to mobile device 100 or features of mobile electronic device 100 may be limited to users that satisfy certain requirements with respect to matching UAFs.

Other types of information may also be used as user authentication factors. For example, UAFs may include unique identifiers (IDs) related to hardware devices such as mobile electronic device 100 or secondary electronic device 120. In some embodiments of the present invention, user authentication is performed using a combination of UAFs. For example, a unique ID may be combined with biometric information to authenticate a user to mobile electronic device 100. Unique IDs may be received by mobile electronic device 100 in many ways. For example, a unique ID may be provided by secondary electronic device 120 using a wireless interface, or by physical contact between mobile electronic device 100 and secondary electronic device 120. Also for example, a unique ID may be provided by an internal subsystem within mobile electronic device 100, such as a hard disk drive, a memory subsystem, or a processor.

Mobile electronic device 100 may provide secure data storage or secure data transfer using symmetric cryptography that utilizes UAFs. For example, a symmetric key may be generated from a mathematical representation of one or more UAFs, and the symmetric key may be used for encryption. Decryption may be performed only after a matching UAF is provided and the symmetric key is again generated. Symmetric cryptography embodiments are described in further detail below with reference to later figures.

Mobile electronic device 100 may include a mechanism to allow mobile electronic device 100 to communicate with a wired or wireless network. For example, mobile electronic device 100 may include circuitry to communicate with a cellular phone network. Note that in these embodiments, mobile electronic device 100 may or may not be a phone. For example, mobile electronic device 100 may be a cellular telephone having symmetric cryptography capabilities. Also for example, mobile electronic device 100 may be a non-telephonic device that has cellular network connectivity. Examples include personal digital assistants, and handheld devices dedicated to secure data storage or secure data exchange. Further, mobile electronic device 100 may be a non-telephonic device having wired or wireless connectivity to a network other than a cellular network, and in some embodiments, mobile electronic device 100 may be a device without network connectivity. Examples include, but are not limited to: Blackberry devices available from Research in Motion (RIM), music players such as MP3 players, cameras, and the like.

In some embodiments, mobile electronic device 100 is an example of a "wearable" device that is capable of securely storing or exchanging data. For example, in some embodiments, mobile electronic device 100 may have the form factor of a wristwatch. Some embodiments of the present invention may have other wearable form factors. For example, a wearable mobile electronic device may be worn in such a manner that it contacts human skin, or it may be worn on clothing. Any wearable intelligent electronic device may be employed without departing from the scope of the present invention.

Figure 2:
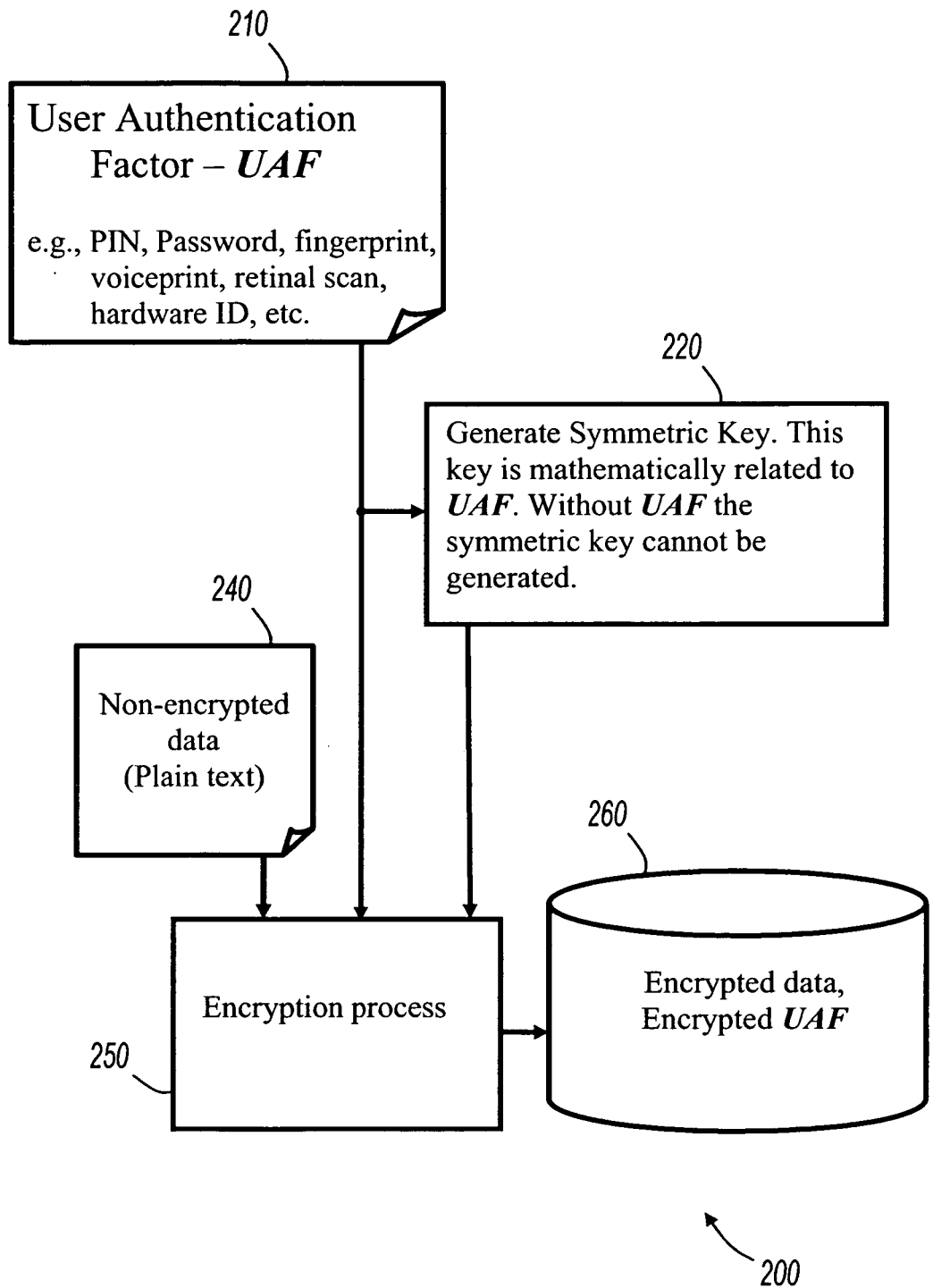
FIGS. 2 and 3 show flow diagrams in accordance with various embodiments of the present invention.

FIG. 2 shows a flow diagram in accordance with various embodiments of the present invention. Diagram 200 represents data flow and actions that may be performed when encrypting data in accordance with various embodiments of the present invention. The various actions represented in FIG. 2 may be performed by a mobile electronic device such as mobile electronic device 100 (FIG. 1), although this is not a limitation of the present invention. For example, the various actions in FIG. 2 may be performed by a non-mobile computing device such as a desktop computer, workstation, or mainframe computer.

Block 210 represents the collection of one or more user authentication factors (UAFs). As shown in block 210, a UAF may be biometric information, a password or PIN, a hardware ID, or any combination. For example, a user may provide a fingerprint and also present a secondary electronic device that transmits a unique hardware ID. The fingerprint and the hardware ID may together be considered a UAF. The collection of UAF may be performed with biometric sensors such as those shown on mobile electronic device 100 (FIG. 1). Further, the collection of UAF may be performed over a wired or wireless interface.

At 220, a symmetric key is generated from the UAF. Any functional relationship may be used to relate the symmetric key to the UAF. For example, if the generation of the key uses one or more prime numbers, prime number generation or selection may be a function of the UAF. Further, in some embodiments, the symmetric key may be set equal to a numerical representation of the UAF. Without the UAF, the symmetric key cannot be generated.

The encryption process at 250 encrypts data 240 and the UAF using the symmetric key generated at 220. The encrypted data and encrypted UAF are stored 260. The symmetric key is not stored.

Figure 3:
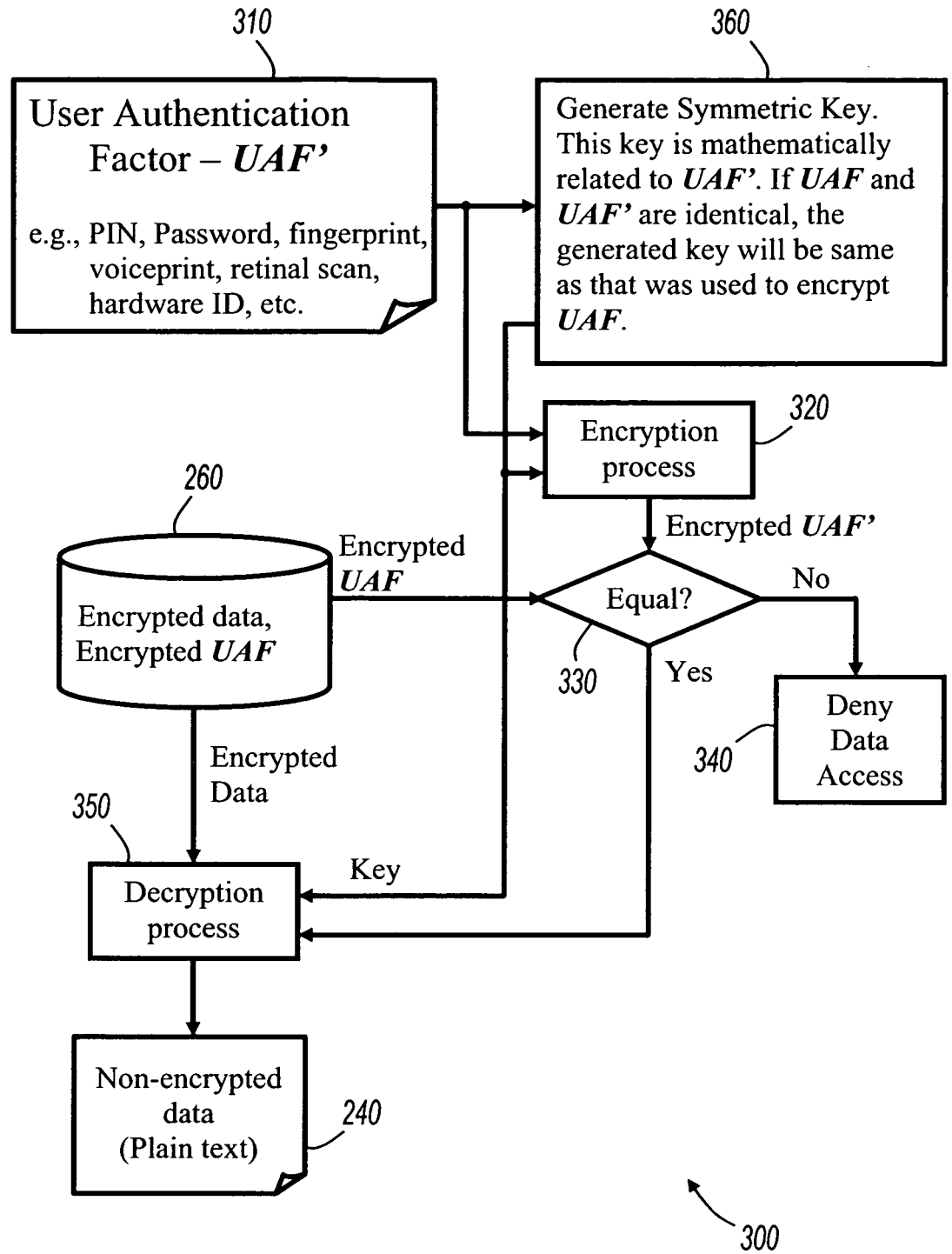

FIG. 3 shows a flow diagram in accordance with various embodiments of the present invention. Diagram 300 represents data flow and actions that may be performed when decrypting data in accordance with various embodiments of the present invention. The various actions represented in FIG. 3 may be performed by a mobile electronic device such as mobile electronic device 100 (FIG. 1), although this is not a limitation of the present invention. For example, the various actions in FIG. 3 may be performed by a non-mobile computing device such as a desktop computer, workstation, or mainframe computer.

Block 310 represents the collection of one or more user authentication factors (UAFs). The UAF in block 310 is collected for the decryption of data and is referred to as UAF' to distinguish it from the UAF collected when the data is encrypted (FIG. 2). As shown in block 310, a UAF' may be biometric information, a password or PIN, a hardware ID, or any combination. For example, a user may provide a fingerprint and also present a secondary electronic device that transmits a unique hardware ID. The fingerprint and the hardware ID may together be considered a UAF'. The collection of UAF' may be performed with biometric sensors such as those shown on mobile electronic device 100 (FIG. 1). Further, the collection of UAF' may be performed over a wired or wireless interface.

The encrypted data and encrypted UAF are shown stored at 260 as a product of the various actions shown in FIG. 2. At 360, a symmetric key is generated from UAF'. If UAF and UAF' are identical, then the user providing UAF' should be granted access to the encrypted data. At 320, the collected UAF' is encrypted using the symmetric key generated at 360, and the result is compared with the encrypted UAF stored at 260. If there is no match, then data access is denied at 340. If there is a match (signifying that UAF and UAF' are equal), then the decryption process at 350 uses the symmetric key to decrypt the data, and the result is the non-encrypted data 240.

Using symmetric encryption embodiments represented by FIG. 2, once the encryption process is completed, the data stored does not include the symmetric key needed to decrypt the data. Using symmetric decryption embodiments represented by FIG. 3, the stored data cannot be decrypted unless and until the UAF' is authenticated to be correct. The UAF verification process generates a symmetric key from the collected UAF, and the encrypted data can only be decrypted if a valid UAF is provided.

As described above, the user authentication factor (UAF) can include one or more of biometric factors identifying an individual, passwords or PINs identifying a privileged person or class of persons, or hardware device specific IDs that identify the presence or proximity of a particular piece of equipment. In some embodiments, the UAF used to generate the symmetric key is formed by combining biometric information with one or more hardware IDs. In these embodiments, a valid user may only access encrypted data when a particular piece of hardware is present. For example, a hardware ID from secondary device 120 (FIG. 1) may be combined with a user's fingerprint to form a UAF used to generate a symmetric key. Also for example, a hardware ID from within mobile electronic device 100 (FIG. 1) may be combined with a biometric factor collected by one or more of the various biometric collection components shown in FIG. 1.

Figure 4:
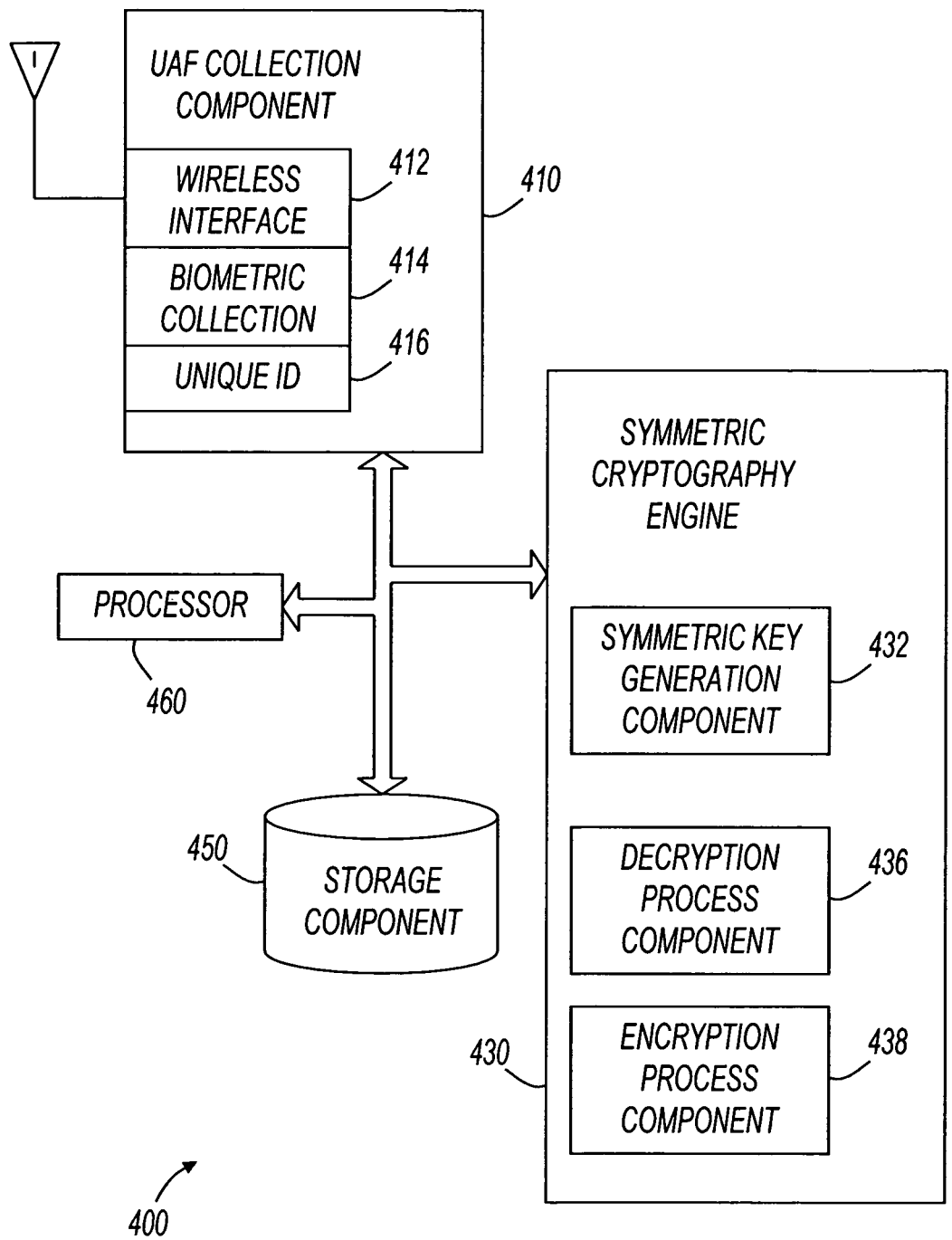
FIG. 4 shows a computer system in accordance with various embodiments of the present invention.

FIG. 4 shows a computer system in accordance with various embodiments of the present invention. Computer system 400 may be a mobile electronic device such as mobile electronic device 100 (FIG. 1), or may be a non-mobile device such as a desktop computer, workstation, server, or mainframe. Computer system 400 includes processor 460, user authentication factor (UAF) collection component 410, symmetric cryptography engine 430, and storage component 450.

UAF collection component 410 includes one or more components capable of collecting user authentication factors. For example, UAF collection component 410 may include wireless interface 412 to communicate with other electronic devices to receive user authentication factors. Any type of UAF information may be received over wireless interface 412. For example, wireless interface 412 may communicate with a secondary wireless device such as a mobile phone or key fob having a unique ID that is used as a UAF. Also for example, wireless interface 412 may communicate with other computer systems that provide one or more UAFs.

Biometric collection component 414 may include one or more interfaces to collect biometric information of a user. For example, biometric collection component 414 may include a fingerprint scanner, a retinal scanner, a voice recorder, or the like. Unique ID 416 may be collected by UAF collection component 410 in many different ways. For example, one or more subsystems within computer system 400 may provide a unique hardware ID for use as a UAF. Further, unique ID 416 may be provided by a hardware device that is separate from, or separable from, computer system 400.

UAF collection component 410 may be implemented in hardware, software, or any combination. For example, wireless interface 412 may include a network interface card (NIC) that includes a processing device and firmware. Further, biometric collection component 414 may include hardware to provide a physical interface to a person, and may also include a device driver to be executed by processor 460. User authentication factors collected by UAF collection component 410 may be utilized to generate symmetric keys in a symmetric cryptography engine. For example, UAF collection component may provide the UAF referenced in FIG. 2 and the UAF' referenced in FIG. 3.

Symmetric cryptography engine 430 includes symmetric key generation component 432, decryption process component 436, and encryption process component 438. The various components of symmetric cryptography engine 430 may be implemented in hardware, software or any combination. For example, the various components may be implemented in software that is executed by processor 460. In these embodiments, the various components of symmetric cryptography engine 430 may be embodied as instructions on a machine readable medium such as a memory device, hard disk drive, or other storage medium.

In some embodiments, symmetric key generation component 432 generates a symmetric key from a user authentication factor. For example, symmetric key generation component 432 may perform actions shown at 220 in FIG. 2 or at 360 in FIG. 3. In some embodiments, decryption process component 436 utilizes a symmetric key to decrypt encrypted data. For example, decryption process component 436 may perform actions shown at 350 in FIG. 3. Also in some embodiments, encryption process component 438 utilizes a symmetric key to encrypt data. For example, encryption process component 438 may perform actions shown at 250 in FIG. 2.

Storage component 450 may be any type of storage component capable of storing encrypted data and encrypted UAFs. For example, storage component 450 may be a memory such as a static random access memory (SRAM), dynamic random access memory (DRAM), or FLASH memory. Also for example, storage component 450 may be a hard disk, floppy disk, CDROM storage, or any other type of storage. Storage component 450 may also include a machine readable medium that includes instructions that when accessed result in processor 460 performing actions. For example, storage component 450 may have instructions to implement the various components of symmetric cryptography engine 430.

Processor 460 represents a processor capable of communicating with the other blocks shown in computer system 400. For example, processor 460 may be a microprocessor, a digital signal processor (DSP), a microcontroller, or the like. Further, processor 460 may be formed from state machines or other sequential logic. In operation, processor 460 may read instructions and/or data from storage component 450, symmetric cryptography engine 430, or UAF collection component 410. For example, processor 460 may execute program instructions that implement symmetric cryptography engine 430.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method for encrypting data in a mobile electronic device comprising:
   receiving, at the mobile electronic device, at least one user authentication factor to authenticate a user to the mobile electronic device;
   generating, by the mobile electronic device, a symmetric key as a function of the at least one user authentication factor; and
   encrypting, by the mobile electronic device, the at least one user authentication factor using the symmetric key to produce an encrypted at least one user authentication factor.

2. The method of claim 1 wherein the at least one user authentication factor includes a unique ID for a hardware device.

3. The method of claim 2 wherein the hardware device comprises a hardware device physically separate from an apparatus performing the method.

4. The method of claim 2 wherein the hardware device comprises a hardware device physically separable from an apparatus performing the method.

5. The method of claim 1 wherein the at least one user authentication factor includes a biometric factor.

6. The method of claim 1 wherein the at least one user authentication factor includes a unique ID for a hardware device and a biometric factor.

7. The method of claim 1 further comprising:
   storing the encrypted at least one user authentication factor.

8. A method for decrypting data in a mobile electronic device comprising:
   receiving, at the mobile electronic device, at least one user authentication factor to authenticate a user to the mobile electronic device;
   generating, by the mobile electronic device, a symmetric key as a function of the at least one user authentication factor; and
   encrypting, by the mobile electronic device, the at least one user authentication factor using the symmetric key to produce a result, and comparing the result with a stored encrypted user authentication factor.

9. The method of claim 8 wherein the at least one user authentication factor includes a unique ID for a hardware device.

10. The method of claim 9 wherein the hardware device comprises a hardware device physically separate from an apparatus performing the method.

11. The method of claim 9 wherein the hardware device comprises a hardware device physically separable from an apparatus performing the method.

12. The method of claim 8 wherein the at least one user authentication factor includes a biometric factor.

13. The method of claim 8 wherein the at least one user authentication factor includes a unique ID for a hardware device and a biometric factor.

14. A mobile device with a machine accessible non-transitory medium having instructions stored thereon that when accessed result in the mobile device performing:
   receiving at least one user authentication factor to authenticate a user to the mobile device;
   generating a symmetric key as a function of the at least one user authentication factor; and encrypting the at least one user authentication factor using the symmetric key to produce an encrypted at least one user authentication factor.

15. The mobile device of claim 14 wherein the at least one user authentication factor includes a unique ID for a hardware device.

16. The mobile device of claim 15 wherein the hardware device comprises a hardware device physically separate from the machine performing the method.

17. The mobile device of claim 15 wherein the hardware device comprises a hardware device physically separable from the machine performing the method.

18. The mobile device of claim 14 wherein the at least one user authentication factor includes a biometric factor.

19. The mobile device of claim 14 wherein the at least one user authentication factor includes a unique ID for a hardware device and a biometric factor.

20. A mobile device with a machine accessible non-transitory medium having instructions stored thereon that when accessed result in the mobile device performing:
   receiving at least one user authentication factor to authenticate a user to the mobile device;
   generating a symmetric key as a function of the at least one user authentication factor; and
   encrypting the at least one user authentication factor using the symmetric key to produce a result, and comparing the result with a stored encrypted user authentication factor.

21. The mobile device of claim 20 wherein the at least one user authentication factor includes a unique ID for a hardware device.

22. The mobile device of claim 21 wherein the hardware device comprises a hardware device physically separate from the machine performing the method.

23. The mobile device of claim 21 wherein the hardware device comprises a hardware device physically separable from the machine performing the method.

24. The mobile device of claim 20 wherein the at least one user authentication factor includes a biometric factor.

25. The mobile device of claim 20 wherein the at least one user authentication factor includes a unique ID for a hardware device and a biometric factor.

26. A computer system for storing and accessing encrypted data, comprising:
   a user authentication factor collection component to receive at least one user authentication factor to authenticate a user to the computer system;
   a symmetric key generation component to generate a symmetric key as a function of the at least one user authentication factor;
   an encryption process component to encrypt data and the at least one user authentication factor using the symmetric key; and
   a decryption process component to decrypt encrypted data using the symmetric key.

27. The computer system of claim 26 further comprising a storage component to store encrypted data and an encrypted user authentication factor.

28. The computer system of claim 26 wherein the user authentication factor collection component is configured to receive a unique ID for a hardware device as a user authentication factor.

29. The computer system of claim 28 wherein the hardware device comprises a hardware device physically separable from the computer system.

30. The computer system of claim 26 wherein the user authentication factor collection component is configured to receive a biometric factor as a user authentication factor.

31. The computer system of claim 26 wherein the user authentication factor collection component is configured to receive a unique ID for a hardware device and a biometric factor as user authentication factors.

32. A mobile device comprising:
   means for collecting at least one user authentication factor to authenticate a user to the mobile device;
   means for generating a symmetric key as a function of the at least one user authentication factor;
   means for encrypting the at least one user authentication factor using the symmetric key;
   means for encrypting data using the symmetric key; and
   means for decrypting data using the symmetric key.

33. A handheld device to store encrypted data, comprising:
   a biometric collection device to collect a biometric user authentication factor to authenticate a user to the handheld device; and
   a symmetric cryptography engine to generate a symmetric key as a function of the biometric user authentication factor, and to encrypt the biometric user authentication factor using the symmetric key.

34. The handheld device of claim 33 wherein the biometric collection device comprises a fingerprint collection device.

35. The handheld device of claim 33 wherein the biometric collection device comprises a retinal scanner.

36. The handheld device of claim 33 further comprising a wireless interface to receive a unique ID from a wireless device.

37. The handheld device of claim 36 wherein the symmetric cryptography engine is configured to generate the symmetric key from the unique ID and the biometric user authentication factor.

* * * * *